(12) United States Patent
Byun et al.

(10) Patent No.: US 10,681,501 B2
(45) Date of Patent: Jun. 9, 2020

(54) METHOD AND APPARATUS FOR TRANSMITTING V2X MESSAGE

(71) Applicant: LG ELECTRONICS INC., Seoul (KR)

(72) Inventors: Daewook Byun, Seoul (KR); Youngdae Lee, Seoul (KR); Jian Xu, Seoul (KR)

(73) Assignee: LG ELECTRONICS INC., Seoul (KR)

(*) Notice: Subject to any disclaimer, the term of this patent is extended or adjusted under 35 U.S.C. 154(b) by 105 days.

(21) Appl. No.: 15/575,781

(22) PCT Filed: Jun. 10, 2016

(86) PCT No.: PCT/KR2016/006197
§ 371 (c)(1),
(2) Date: Nov. 20, 2017

(87) PCT Pub. No.: WO2016/200213
PCT Pub. Date: Dec. 15, 2016

(65) Prior Publication Data
US 2018/0124574 A1    May 3, 2018

Related U.S. Application Data

(60) Provisional application No. 62/173,969, filed on Jun. 11, 2015.

(51) Int. Cl.
*H04W 4/00* (2018.01)
*H04W 4/06* (2009.01)
(Continued)

(52) U.S. Cl.
CPC .......... *H04W 4/06* (2013.01); *H04L 12/1845* (2013.01); *H04W 76/00* (2013.01); *H04W 88/08* (2013.01);
(Continued)

(58) Field of Classification Search
CPC ....... H04W 4/06; H04W 76/00; H04W 88/08; H04W 92/20; H04L 12/1845; H04L 1/004; H04L 12/189; H04L 67/12
See application file for complete search history.

(56) References Cited

U.S. PATENT DOCUMENTS

2009/0235071 A1   9/2009 Bellur et al.
2011/0021224 A1*  1/2011 Koskinen ............ H04W 72/005
                                                    455/507
(Continued)

FOREIGN PATENT DOCUMENTS

WO      2013163265       10/2013

OTHER PUBLICATIONS

ETSI (V1.1.1 (Feb. 2012), intelligent transport system (ITS); framework for public mobile networks in cooperative ITS). (Year: 2012).*
(Continued)

*Primary Examiner* — Maharishi V Khirodhar
(74) *Attorney, Agent, or Firm* — Lee Hong Degerman Kang Waimey

(57) ABSTRACT

Provided are a method for transmitting, by a base station in a wireless communication system, a vehicle to everything (V2X) message, and an apparatus for supporting the same. The base station may receive broadcast area information indicative of areas to which the V2X message will be broadcast, from a multi-cell coordination entity (MCE), receive the V2X message from a terminal, and transmit the received V2X message to a neighboring base station. Provided are a method for transmitting, by a V2X server in a wireless communication system, a vehicle to everything (V2X) message, and an apparatus for supporting the same. The V2X server may receive the V2X message transmitted by a base station from a serving/packet-gateway (S/P-GW), determine a broadcast of the received V2X message, and transmit the V2X message to a base station that belongs to (Continued)

the same multimedia broadcast single frequency network (MBSFN) area as the base station.

3 Claims, 20 Drawing Sheets

(51) Int. Cl.
  *H04W 88/08*   (2009.01)
  *H04W 76/00*   (2018.01)
  *H04W 92/20*   (2009.01)
  *H04L 12/18*   (2006.01)
  *H04L 1/00*   (2006.01)
  *H04L 29/08*   (2006.01)

(52) U.S. Cl.
  CPC ............. *H04W 92/20* (2013.01); *H04L 1/004* (2013.01); *H04L 12/189* (2013.01); *H04L 67/12* (2013.01)

(56) References Cited

U.S. PATENT DOCUMENTS

| | | | |
|---|---|---|---|
| 2011/0170517 A1* | 7/2011 | Bakker | H04W 36/0033 370/331 |
| 2013/0078945 A1 | 3/2013 | Lavi et al. | |
| 2013/0099941 A1 | 4/2013 | Jana et al. | |
| 2016/0013977 A1* | 1/2016 | Hu | H04W 72/005 370/329 |
| 2016/0080163 A1* | 3/2016 | Taylor | H04L 12/189 370/312 |
| 2017/0223662 A1* | 8/2017 | Xu | H04L 65/1069 |

OTHER PUBLICATIONS

Riaz ( Cooperative & cost-effective network selection: a novel approach to support location-dependent & context-aware service migration in VANETs, Jun. 1, 2015, University of Glasgow). (Year: 2015).*

Ivan (VISIONS "vehicular communication improvement: Solution based on IMS operational nodes and services", 2013, ETSITUPM) (Year: 2013).*

Kan et al. (Heterogeneous Vehicular Networking: Survey on Architecture, Challenges and solutions, IEEE, Jun. 1, 2015). (Year: 2015).*

Luca Reggiani et al. (Small LTE Base Stations Deployment in vehicle to Road infrastructure communications, 2013). (Year: 2013).*

PCT International Application No. PCT/KR2016/006197, International Search Report dated Aug. 24, 2016, 2 pages.

LG Electronics Inc., "Proposed study on LTE-based V2X", S1-150238, 3GPP TSG-SA WG1 Meeting #69, Feb. 2015, 5 pages.

* cited by examiner

FIG. 3
(Prior Art)
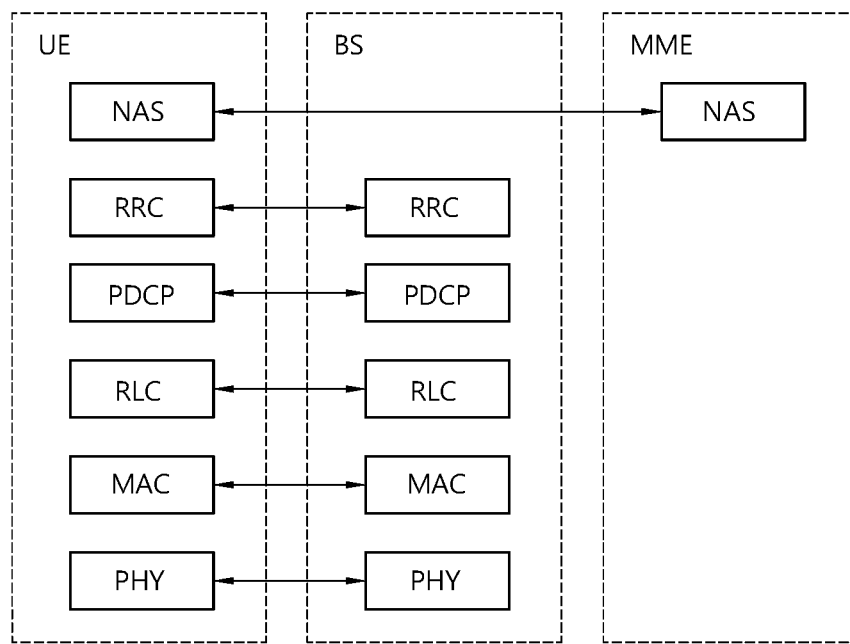
(a)
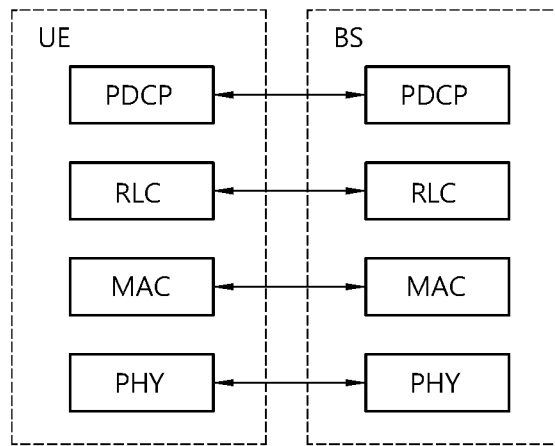
(b)

METHOD AND APPARATUS FOR TRANSMITTING V2X MESSAGE

CROSS-REFERENCE TO RELATED APPLICATIONS

This application is the National Stage filing under 35 U.S.C. 371 of International Application No. PCT/KR2016/006197, filed on Jun. 10, 2016, which claims the benefit of U.S. Provisional Application No. 62/173,969, filed on Jun. 11, 2015, the contents of which are all hereby incorporated by reference herein in their entirety.

BACKGROUND OF THE INVENTION

Field of the Invention

The present invention relates to a wireless communication system, and more particularly, to a method for transmitting, by a base station or a vehicle-to-everything (V2X) server, a V2X message, and an apparatus supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A base station (BS) allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

An important communication technique such as public safety or group communication system enablers for LTE (GCSE_LTE) has been introduced in Rel-12. In Rel-12 GCSE, group communication has been designated as eMBMS. The eMBMS is designed to supply media content to a pre-planned wide area (i.e., an MBSFN area). The MBSFN area is rather static (e.g., configured by O&M), and cannot be dynamically adjusted according to user distribution. Even if all radio resources of a frequency domain is not used, eMBMS transmission may occupy a full system bandwidth, and multiplexing with unicast is not allowed in the same subframe. An MBSFN subframe configuration is also rather static (e.g., configured by O&M). That is, an MBSFN subframe cannot be dynamically adjusted according to the number of dynamic groups and a traffic load of a dynamic group. Therefore, when providing an importance communication service, a radio resource configuration for the eMBMS may be unnecessarily wasted. Therefore, single-cell point-to-multipoint (SCPTM) transmission is proposed for an effective use of the radio resource. While identifiable signals are transmitted simultaneously in a plurality of cells in the MBSFN transmission, the MBMS service is transmitted in a single cell in the SCPTM transmission.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, an D2D operation.

The D2D operation may be signal transmission/reception between adjacent devices to have various advantages. For example, a D2D terminal may perform data communication with a high transmission rate and low delay. Further, the D2D operation may distribute traffic converged in a BS. If the D2D terminal serves as a relay, the D2D terminal may serve to extend coverage of a BS.

Vehicle-to-infra/vehicle/nomadic (V2X) is a technique which adds mobility to a D2D technique to persistently communicate with a road infrastructure or other vehicles while driving a vehicle, thereby exchanging and sharing useful information such as a traffic condition or the like. V2X networking is roughly divided into three categories, that is, vehicle-to-infrastructure (hereinafter, V2I), vehicle-to-vehicle (hereinafter, V2V), and vehicle-to-nomadic devices (hereinafter, V2N) communication. It is expected that vehicle-to-grid (V2G) is added thereto in a near future as another type of communication classification with regard to charging of electric vehicles which are recently drawing attention.

SUMMARY OF THE INVENTION

An accident, such as a car crash, may be reported to a base station (BS) and an RSU via a vehicle-to-everything (V2E) message. Upon receiving the V2X message, the BS or RSU may transmit this message to a user equipment (UE) in the coverage thereof. However, there is no procedure for transmitting the received V2X message to another BS. Accordingly, a procedure may be needed for transmitting the received V2X message to another BS.

According to one embodiment, there is provided a method for transmitting, by a BS, a V2X message in a wireless communication system. The BS may include: receiving broadcast area information indicating an area in which a V2X message is to be broadcast from a multi-cell coordination entity (MCE); receiving the V2X message from a UE;

and transmitting the received V2X message to a neighboring BS. The broadcast area information may be preset by the MCE.

The broadcast area information may include information on a BS to which the received V2X message is to be transmitted. The neighboring BS may be included in the information on the BS to which the received V2X message is to be transmitted. The neighboring BS may be connected to the BS via X2. The BS may not be connected to a V2X server. The BS may further include receiving a bearer configuration for transmitting and receiving the V2X message from a mobility management entity (MME).

The BS may further include determining a BS to which the received V2X message is to be transmitted based on the broadcast area information. The BS may be connected to a V2X server. The neighboring BS may be determined as the BS to which the received V2X message is to be transmitted.

The BS may further include transmitting synchronization-related information to the neighboring BS. The BS may further include broadcasting the V2X message in a coverage area thereof.

According to another embodiment, there is provided a method for transmitting, by a V2X server, a V2X message in a wireless communication system. The V2X server may include: receiving a V2X message transmitted from a BS via a serving/packet gateway (S/P-GW); determining to broadcast the received V2X message; and transmitting the V2X message to a BS belonging to the same multimedia broadcast single frequency network (MBSFN) area as the BS.

The V2X message may be transmitted to the BS via a broadcast and multicast service center (BM-SC) and a multimedia broadcast multicast service gateway (MBMS-GW).

The V2X server may further include interpreting the received V2X message, and broadcast of the received V2X message may be determined based on an interpretation.

According to still another embodiment, there is provided a BS transmitting a V2X message in a wireless communication system. The BS may include: a memory; a transceiver; and a processor to connect the memory and the transceiver, wherein the processor may be configured to control the transceiver to: receive broadcast area information indicating an area in which a V2X message is to be broadcast from an MCE; receive the V2X message from a UE; and transmit the received V2X message to a neighboring BS.

The present invention enables a V2X message received by a BS to be broadcast in the area of another BS.

BRIEF DESCRIPTION OF THE DRAWINGS

FIG. 3 shows a control plane and a user plane of a radio interface protocol of an LTE system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
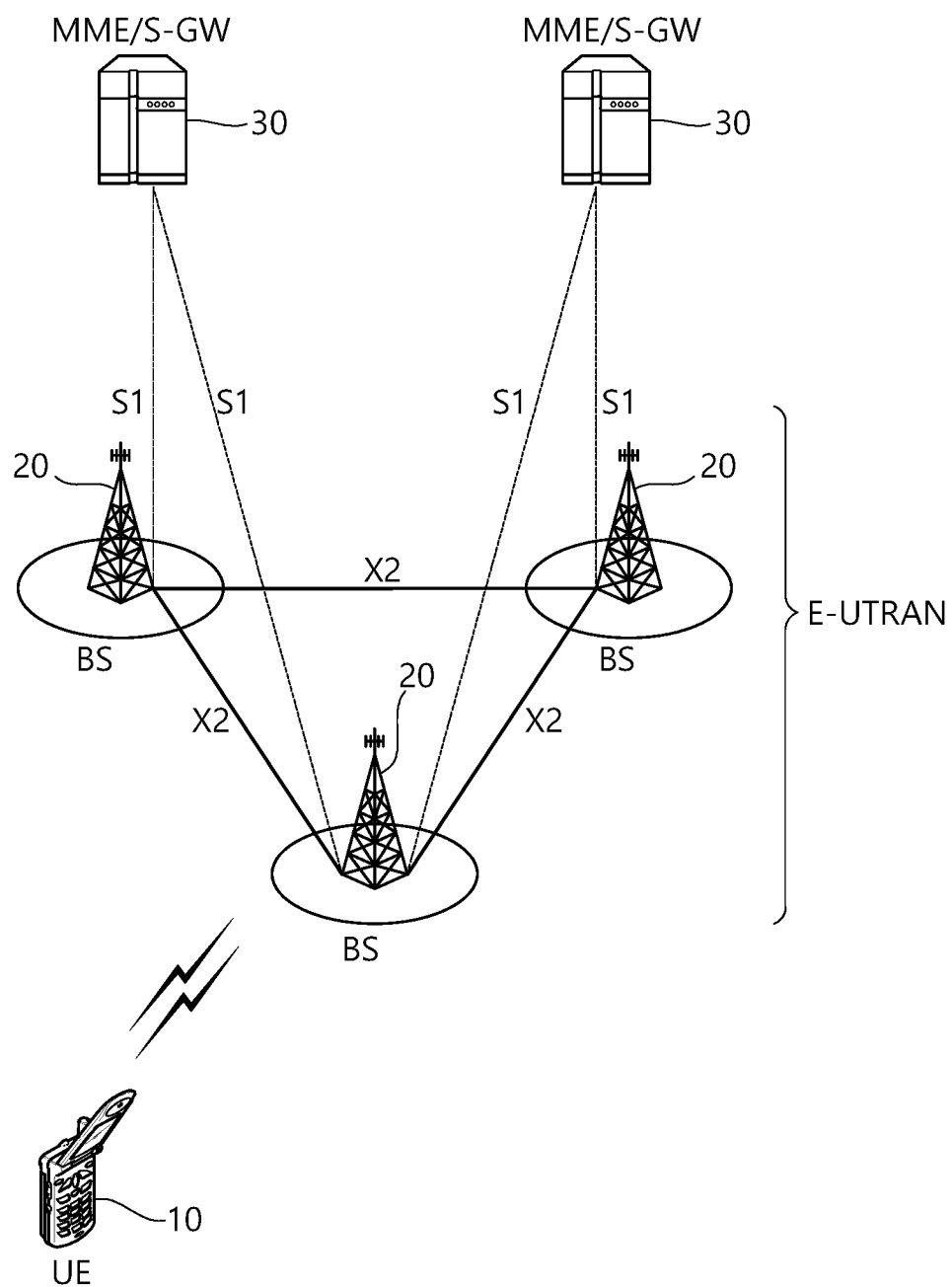
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
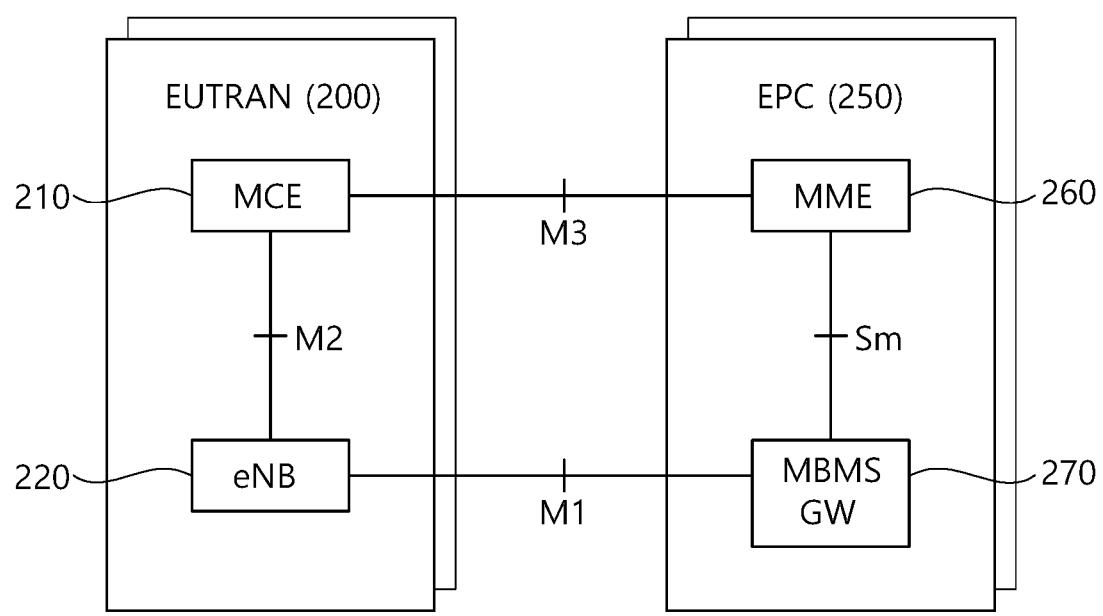
FIG. 2 shows a network architecture for an MBMS.

FIG. 2 shows a network architecture for an Multimedia Broadcast/Multicast Service (MBMS).

Referring to FIG. 2, the radio access network (EUTRAN, 200) includes a multi-cell coordination entity (hereinafter, "MCE", 210) and a base station (eNB, 220). The MCE 210 is a main entity for controlling the MBMS and plays a role to perform session management, radio resource allocation or admission control of the BS 220. The MCE 210 may be implemented in the BS 220 or may be implemented independent from the BS 220. The interface between the MCE 210 and the BS 220 is called M2 interface. The M2 interface is an internal control plane interface of the radio access network 200 and MBMS control information is transmitted through the M2 interface. In case the MCE 210 is implemented in the BS 220, the M2 interface may be present only logically.

The EPC (Evolved Packet Core, 250) includes an MME 260 and an MBMS gateway (GW) 270. The MBMS gateway 270 is an entity for transmitting MBMS service data and is positioned between the BS 220 and the BM-SC and performs MBMS packet transmission and broadcast to the BS 220. The MBMS gateway 270 uses a PDCP and IP multicast to transmit user data to the BS 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the BS 220, session control signaling such as a session start/stop message for session start or session stop, and the BS 220 may inform the UE through a cell notification that the corresponding MBMS service has been started or stopped.

The interface between the BS 220 and the MBMS gateway 270 is a user plane interface and is called M1 interface.

FIG. 3 shows a control plane and a user plane of a radio interface protocol of an LTE system. FIG. 3(*a*) shows a control plane of a radio interface protocol of an LTE system. FIG. 3(*b*) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(a), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
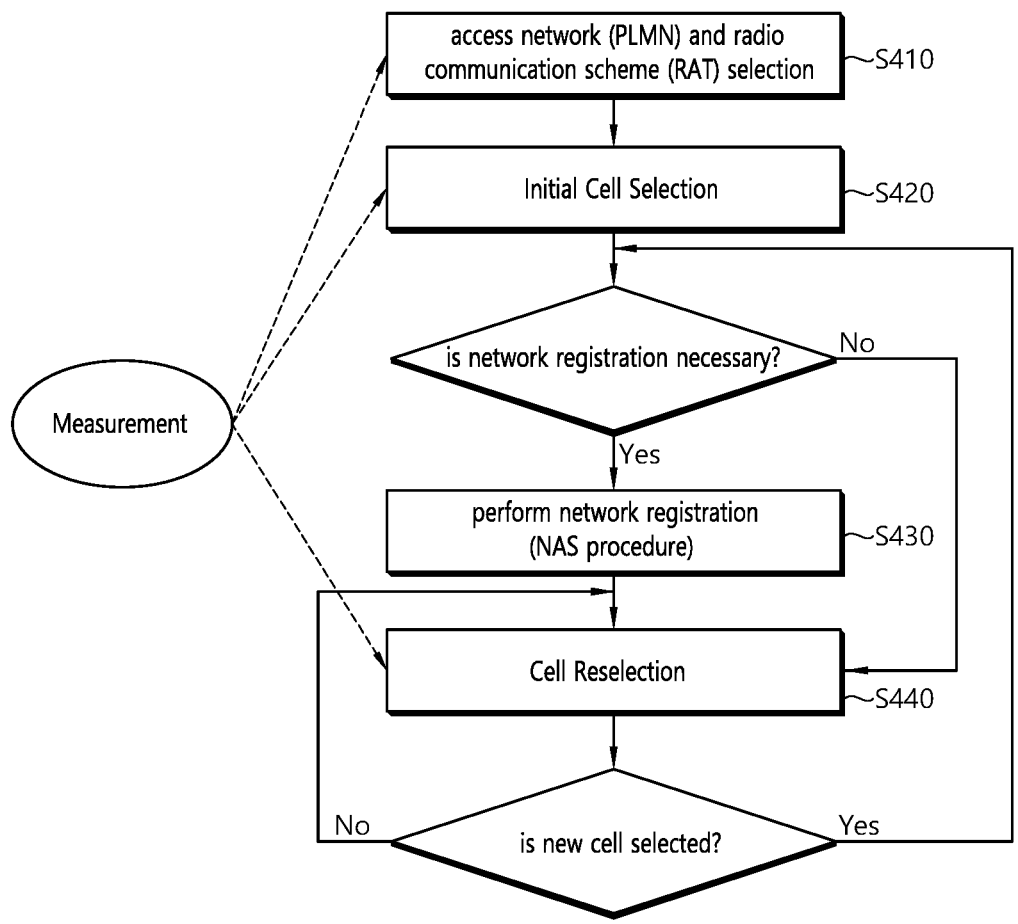
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
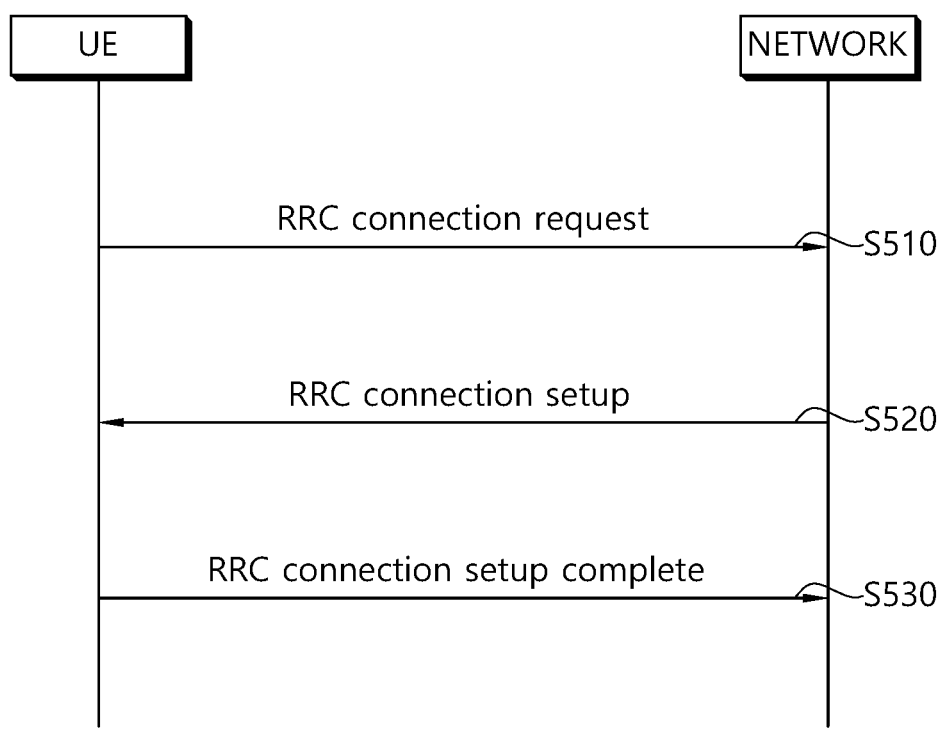
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
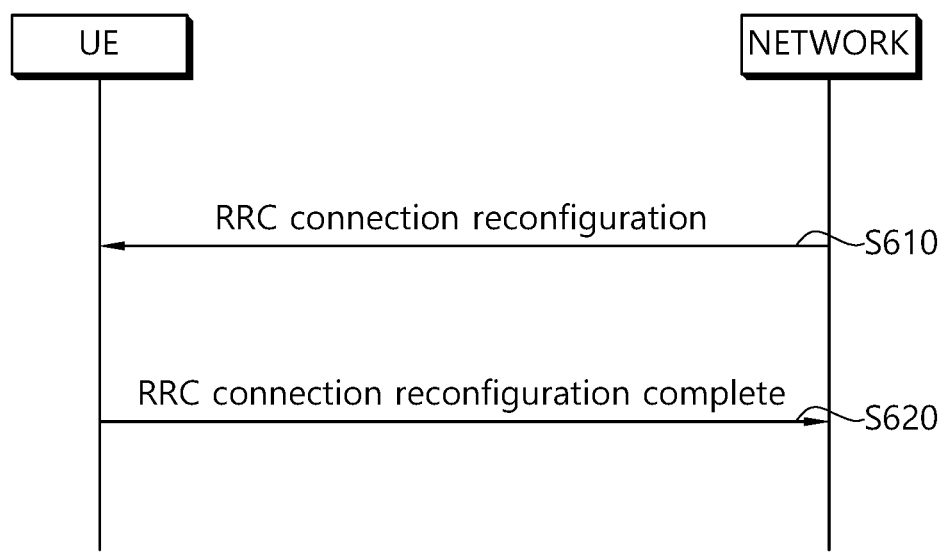
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

Hereinafter, a method and a procedure of selecting a cell by a terminal in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcast by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s Q_{meas,s} + Q_{hyst} R_n Q_{meas,n} Q_{offset}$$ [Equation 1]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
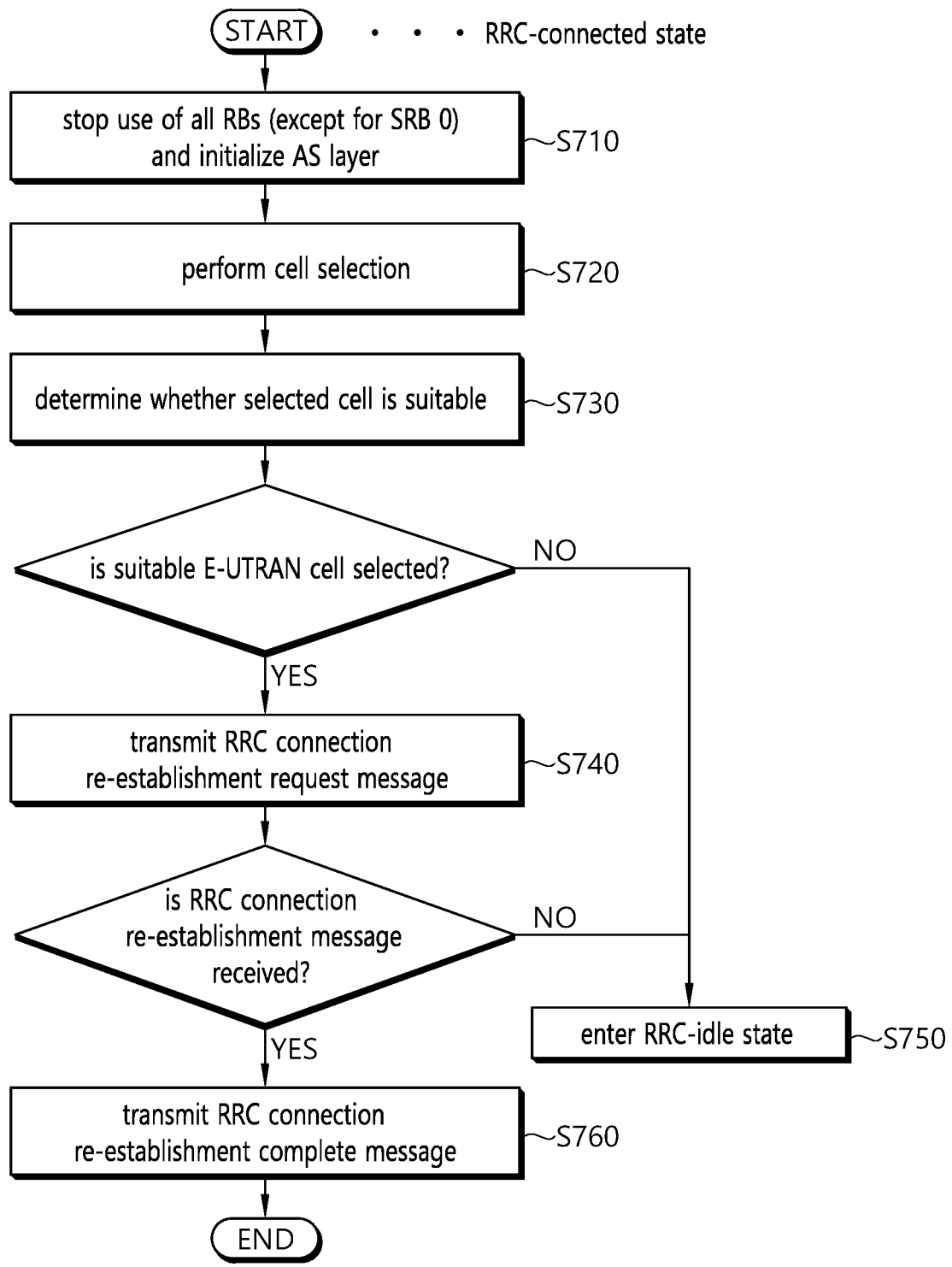
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, an MBMS and a multicast/broadcast single frequency network (MBSFN) are described.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information on a frequency to which the UE wishes to be handed over.

The UE, which wishes to receive a specific MBMS service, first identifies information on a frequency at which the specific service is provided and information on broadcast time at which the specific service is provided. When the MBMS service is already on air or is about to be on air, the UE assigns a highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned a highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

In the RRC_IDLE state, the UE may operate as follows. 1) UE-specific DRX may be set by an upper layer. 2) The UE monitors a paging channel to detect a call, a system information change, and an ETWS notification and performs adjacent cell measurement and cell selection (reselection). The UE may acquire system information and may perform possible measurement.

In the RRC_CONNECTED state, the UE may transmit unicast data and may set UE-specific DRX in a lower layer. The UE supporting CA may use one or more secondary cells along with a primary cell.

The UE monitors the paging channel and monitors the content of system information block (SIB) type 1 to detect a system information change. To determine whether data is scheduled for the UE, the UE monitors control channels associated with a shared data channel. Further, the UE provides channel quality and feedback information. The UE may measure a neighboring cell, may report a measurement result, and acquires system information.

Figure 8:
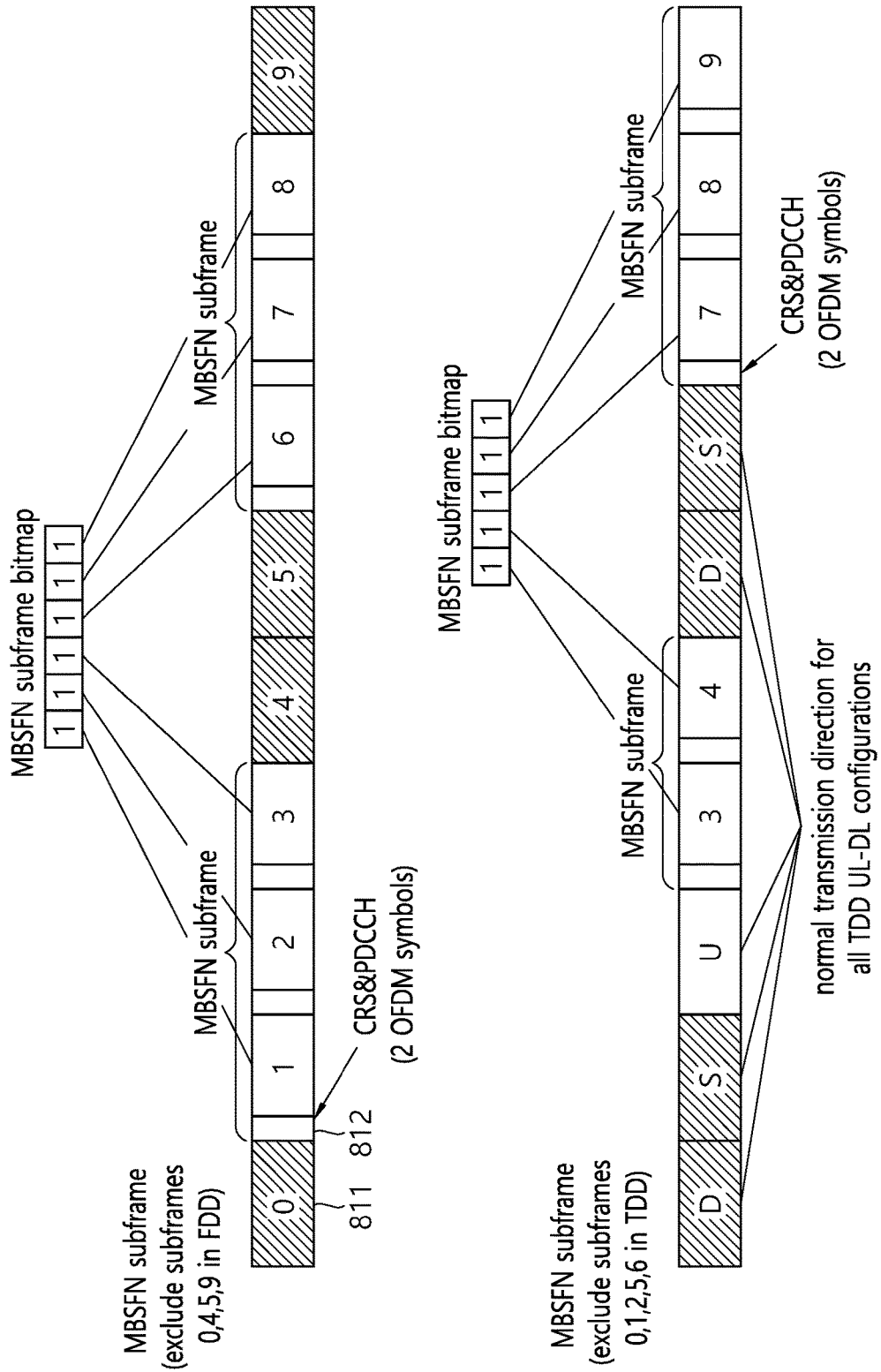
FIG. 8 shows a structure of an MBSFN subframe.

FIG. 8 shows a structure of an MBSFN subframe.

Referring to FIG. 8, MBSFN transmission is configured by the subframe. A subframe configured to perform MBSFN transmission is referred to as an MBSFN subframe. In a subframe configured as an MBSFN subframe, MBSFN transmission is performed in OFDM symbols other than first two OFDM symbols for PDCH transmission. For convenience, a region used for MBSFN transmission is defined as an MBSFN region. In the MBSFN region, no CRS for unicast is transmitted but an MBMS-dedicated RS common to all cells participating in transmission is used.

In order to notify even a UE receiving no MBMS that no CRS is transmitted in the MBSFN region, system information on a cell is broadcast including configuration information on the MBSSFN subframe. Since most UEs perform radio resource management (RRM), radio link failure (RLF) processing, and synchronization using a CRS, it is important to indicate the absence of a CRS in a specific region. A CRS is transmitted in first two OFDM symbols used as a PDCCH in the MBSFN subframe, and this CRS is not for an MBSFN. A CP of the CRS transmitted in the first two OFDM symbols used as the PDCCH in the MBSFN subframe (that is, whether the CRS uses a normal CP or an extended CP) follows a CP applied to a normal subframe, that is, a subframe which is not an MBSFN subframe. For example, when a normal subframe 811 uses a normal CP, a CRS according to the normal CP is also used in the first two OFDM symbols 812 of the MBSFN subframe.

Meanwhile, a subframe to be configured as an MBSFN subframe is designated by FDD and TDD, and a bitmap is used to indicate whether a subframe is an MBSFN subframe. That is, when a bit corresponding to a specific subframe in a bitmap is 1, it is indicated that the specific subframe is configured as an MBSFN subframe.

Figure 9:
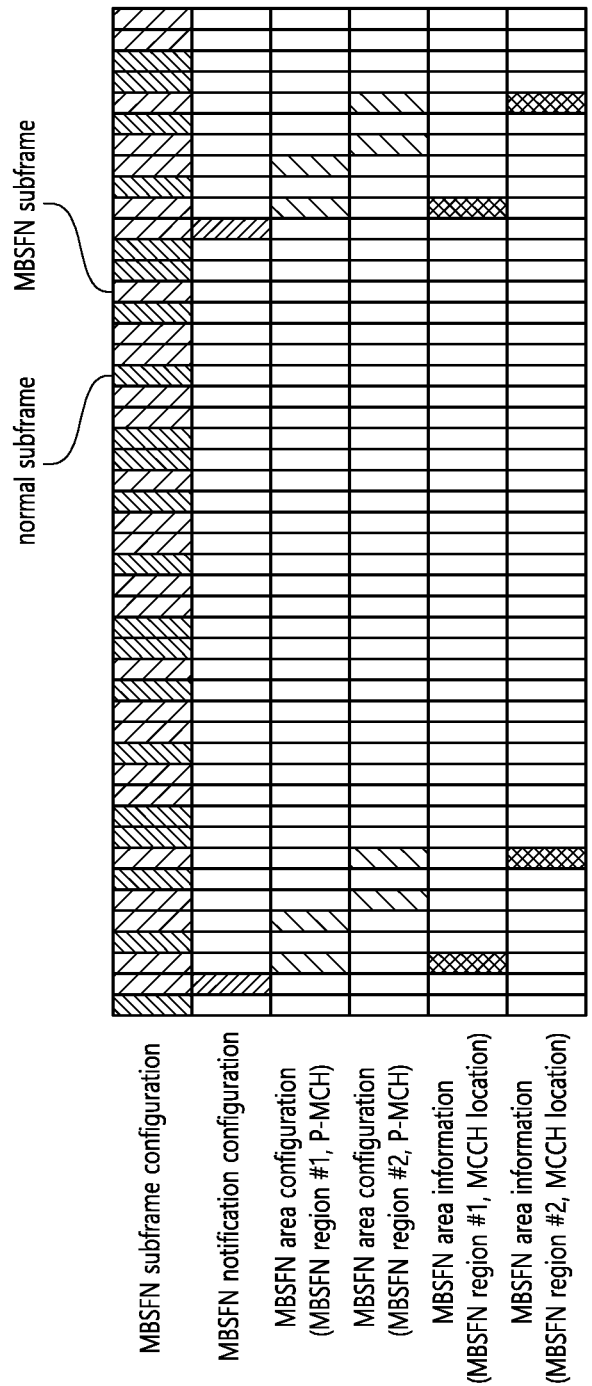
FIG. 9 shows an example of an MBSFN subframe configuration for performing an MBMS service.

FIG. 9 shows an example of an MBSFN subframe configuration for performing an MBMS service.

Referring to FIG. 9, a UE acquires MBSFN subframe configuration information, MBSFN notification configuration information, and MBSFN area information list to perform the MBMS service.

The UE may know the MBSFN subframe configuration information, that is, a position of an MBSFN subframe, through SIB2 and RRC dedicated signaling. For example, the MBSFN subframe configuration information may be included in an MBSFN-SubframeConfig information element (IE).

In addition, the UE may acquire the MBSFN area information list and the MBMS notification configuration information as information required to acquire MBMS control information related to one or more MBSFN regions in which the MBMS service can be performed through SIB13. Herein, for each MBSFN region, the MBSFN area information list may include an MBSFN region ID, information regarding an MBSFN region in an MBSFN subframe in a corresponding MBSFN region, information such as an MBSFN subframe position at which transmission of an MCCH occurs as an MBMS control information channel, or the like. For example, the MBSFN area information list may be included in an MBSFN-AreaInfoList information element. Meanwhile, the MBSFN notification configuration information is configuration information for a subframe position at which an MBMS notification occurs to inform that there is a change in the MBSFN region configuration information. For example, the MBSFN notification configuration information may be included in an MBMS-NotificationConfig information element. The MBSFN notification configuration information includes time information utilized to notify an MCCH change applicable to all MBSFN regions. For example, the time information may include a notification repetition coefficient (notificationRepetitionCoeff), a notification offset (notificationOffset), and a notification subframe index (notificationSF-Index). Herein, the notification repetition coefficient implies a common notification repetition period for all MCCHs. The notification offset indicates an offset of a radio frame in which the MCCH change notification information is scheduled. In addition, the notification subframe index is a subframe index used to transmit an MCCH change notification on a PDCCH.

The UE may acquire the MBSFN region configuration information through an MCCH corresponding to each of the MBSFN regions acquired through SIB13. The MBSFN region configuration information may be included in an MBSFNAreaconfiguration message, and contains information regarding physical multicast channels (PMCHs) used in a corresponding MBSFN region. For example, information regarding each PMCH may include a position of an MBSFN subframe in which a corresponding PMCH is located, modulation and coding scheme (MCS) level information used for data transmission in a corresponding subframe, MBMS service information transmitted by the corresponding PMCH, or the like.

The UE receives MCH data through the MTCH on the basis of the PMCH. Scheduling on a time for the MCH data may be known through MCH scheduling information (MSI) delivered through the PMCH. The MSI contains information regarding how long corresponding MCH data transmission is continued.

Figure 10:
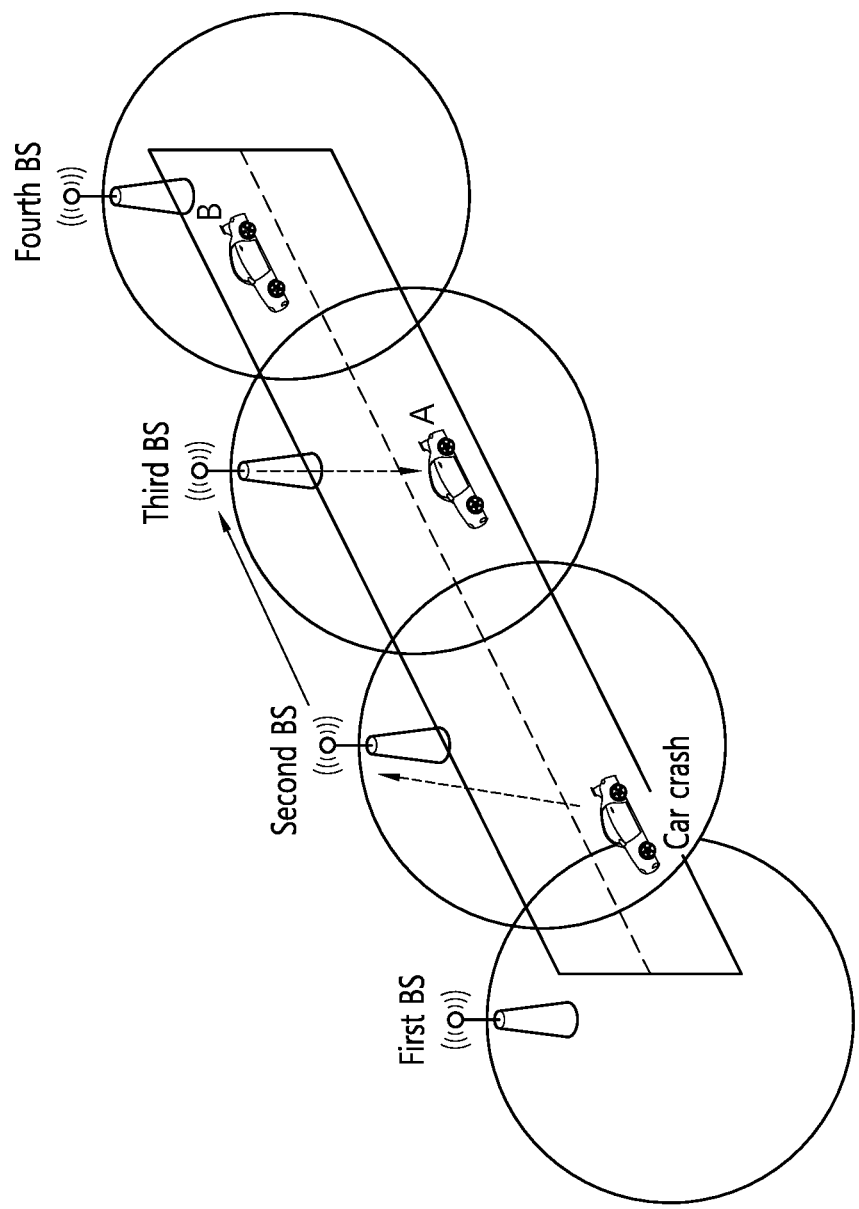
FIG. 10 illustrates a problem that may occur in conventional V2X communication.

FIG. 10 illustrates a problem that may occur in conventional V2X communication.

An accident, for example, a car crash, may be reported to a BS or an RSU via a message. This is for quickly reporting the accident, such as the car crash, to neighboring areas or for reporting the accident to wider areas. Upon receiving the V2X message reporting the accident, such as the car crash, the BS or the RSU may transmit the message to a UE in the coverage thereof. However, there is no procedure for transmitting the received message to a neighboring BS. Further, there is no procedure for transmitting the received V2X message to BSs distributed in a wide area. For example, referring to FIG. 10, when an accident, for example, a car crash, occurs in the area of a second BS, the second BS needs to transmit a V2X message received from the accident car to a third BS, but there is not procedure for transmitting the V2X message to the third BS. Hereinafter, a procedure for transmitting a V2X message according to one embodiment of the present invention is described.

Figure 16:
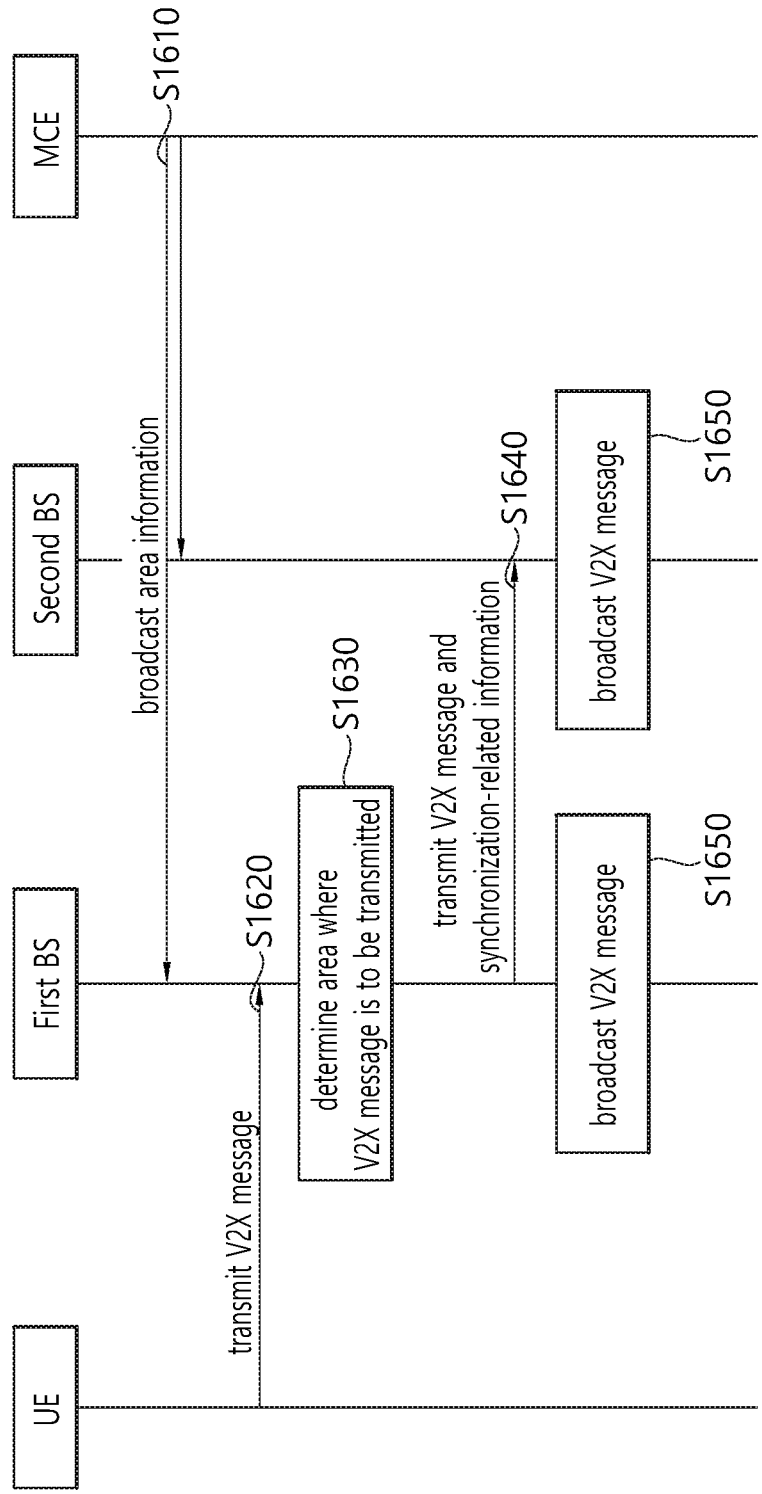
FIG. 16 shows a procedure in which a neighboring BS connected via X2 broadcasts a V2X message.
Figure 17:
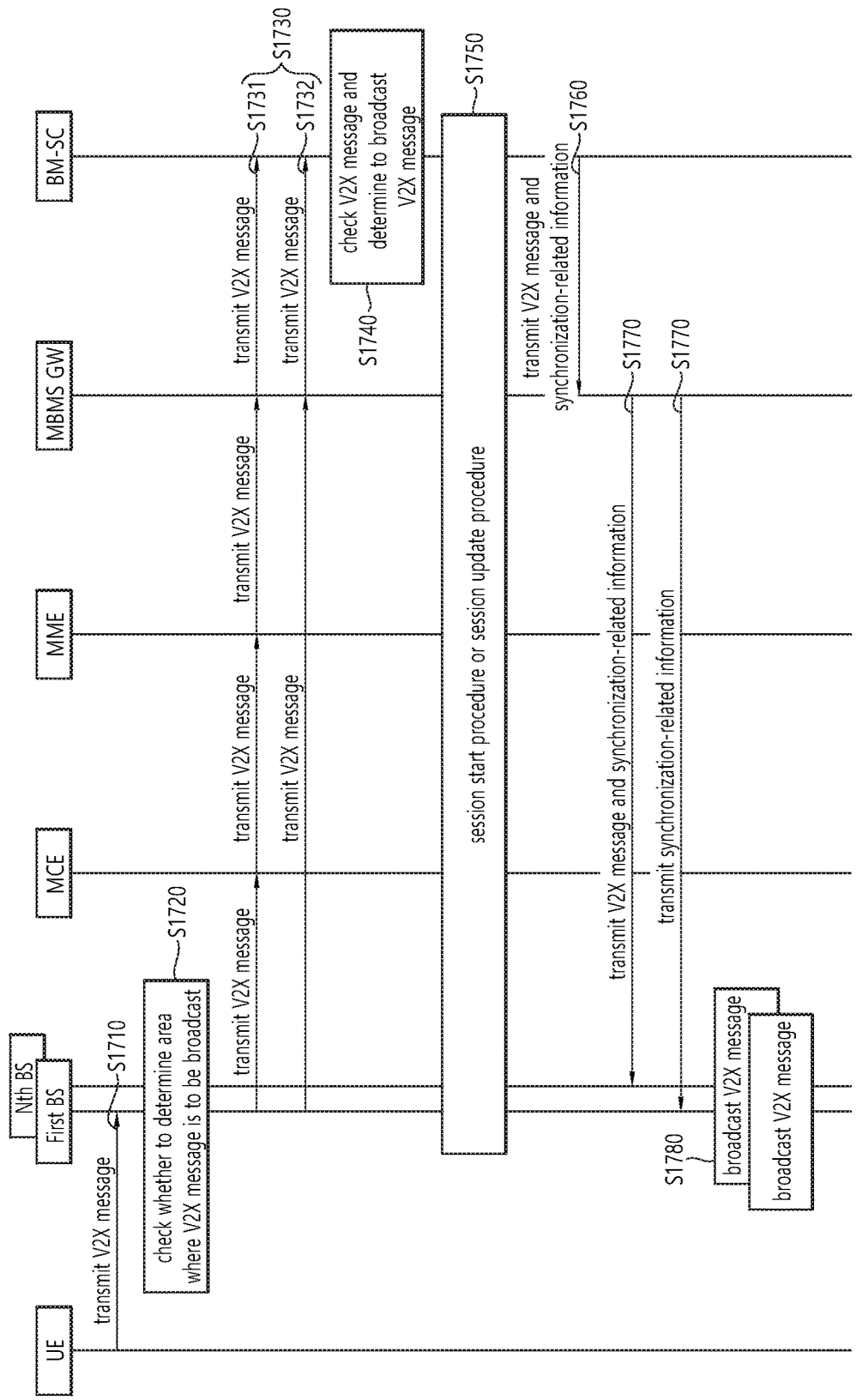
FIG. 17 shows a procedure in which a BS belonging to the same MBSFN area broadcasts a V2X message.

According to one embodiment of the present invention, upon receiving a V2X message from a UE, a BS may provide the V2X message to a neighboring BS having an X2 connection with the BS. Alternatively, according to one embodiment of the present invention, upon receiving a V2X message from a UE, a BS may provide the V2X message to a BS belonging to the same MBSFN area as the BS. Procedures for providing a V2X message may be divided according to whether a BS receiving a V2X message from a UE can or cannot interpret the received V2X message. FIGS. 11 to 15 show procedures for transmitting a V2X message when a BS receiving the V2X message cannot interpret the received V2X message. For example, when the BS includes no V2X server, the BS may not be able to interpret the received V2X message. FIGS. 16 through 17 show procedures for transmitting a V2X message when a BS receiving the V2X message can interpret the received V2X message. For example, when the BS includes a V2X server, the BS may be able to interpret the received V2X message. Hereinafter, the present invention will be described in detail with reference to the drawings.

<When BS Cannot Interpret Received V2X Message>

Figure 11:
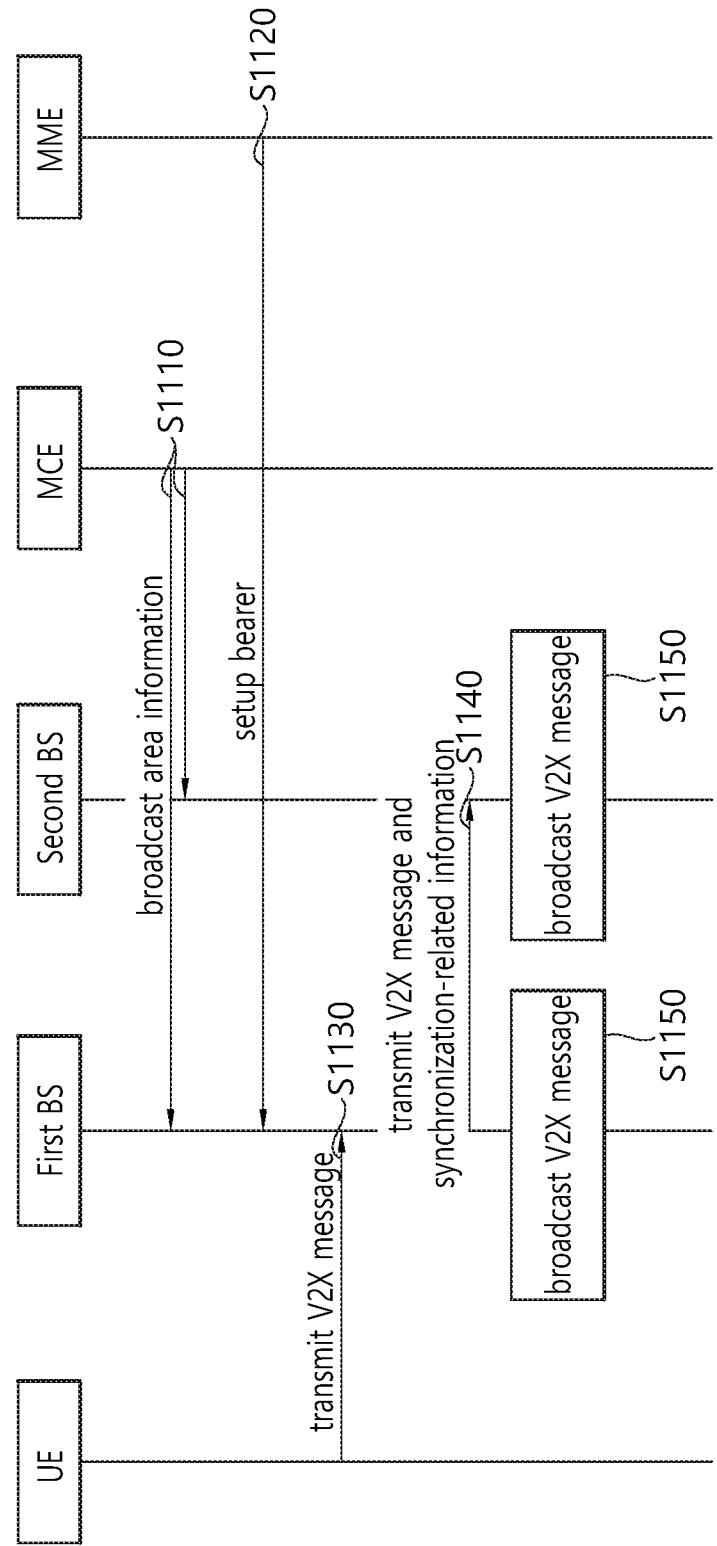
FIG. 11 shows a procedure in which a neighboring BS connected via X2 broadcasts a V2X message when an MCE performs presetting.

FIG. 11 shows a procedure in which a neighboring BS connected via X2 broadcasts a V2X message when an MCE performs presetting.

Referring to FIG. 11, the MCE may preset an area in which the V2X message is to broadcast to a BS managed by the MCE (S1110). For example, the BS may receive, from the MCE, broadcast area information indicating the area in which the V2X message is to be broadcast. In the case of a BS belonging to the preset area, the MCE may establish a relationship between the BS providing the V2X message and the BS receiving the V2X message. In addition, the MCE may provide the established relationship to the BS. For example, when the preset area includes a first BS, a second BS, and a third BS, relationships illustrated in Table 1 may be established. Table 1 below is merely an example, and the technical idea of the present invention is not limited thereto.

TABLE 1

| Relationship | V2X message-providing BS | V2X message-receiving BS |
| --- | --- | --- |
| 1 | First BS | Second BS, third BS |
| 2 | Second BS | First BS, third BS |
| 3 | Third BS | Second BS |

When the first BS receives a V2X message from a UE within the coverage of the first BS, the first BS may transmit the V2X message to the second BS and the third BS in order to broadcast the V2X message to each coverage area.

An MME may transmit a bearer configuration to the BS (S1120). The bearer configuration may be transmitted using a new message, an existing message, a new IE included in the new message, or a new IE included in the existing message. The bearer configuration may indicate that the V2X message needs to be transmitted to a neighboring BS having an X2 connection.

When an accident occurs, the UE may transmit a V2X message to the first BS using the bearer (S1130).

When the first BS receives the V2X message, the first BS may transmit the V2X message and synchronization-related information to the second BS (S1140).

The first BS and the second BS may broadcast the V2X message in respective coverage areas thereof (S1150).

Figure 12:
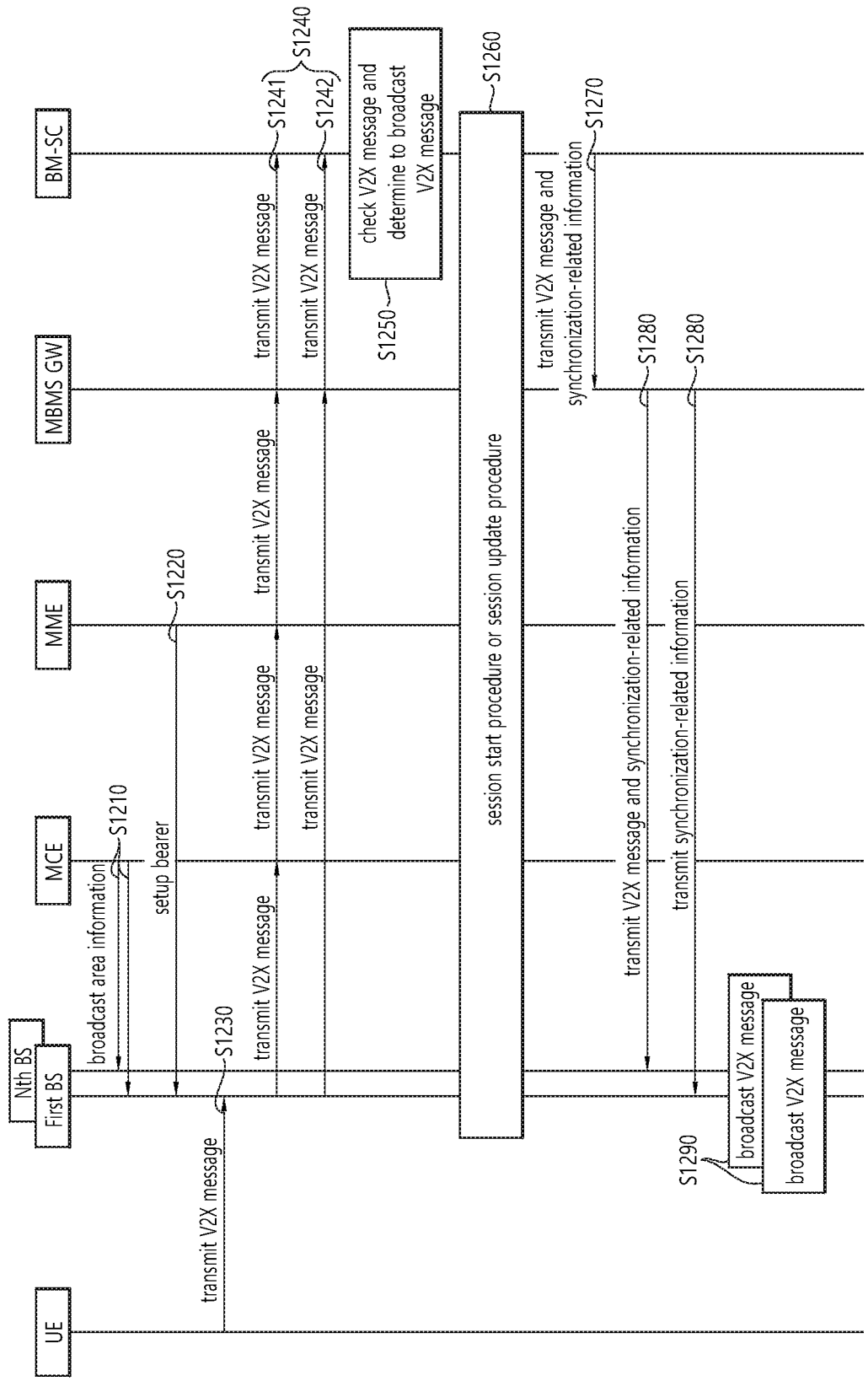
FIG. 12 shows a procedure in which a BS belonging to the same MBSFN area broadcasts a V2X message when an MCE performs presetting.

FIG. 12 shows a procedure in which a BS belonging to the same MBSFN area broadcasts a V2X message when an MCE performs presetting.

Referring to FIG. 12, the MCE may preset an area in which the V2X message is to broadcast to a BS managed by the MCE (S1210). For example, the BS may receive, from the MCE, broadcast area information indicating the area in which the V2X message is to be broadcast. In the case of a BS belonging to the preset area, the MCE may establish a relationship between the BS providing the V2X message and the BS receiving the V2X message. In addition, the MCE may provide the established relationship to the BS.

An MME may transmit a bearer configuration to the BS (S1220). The bearer configuration may be transmitted using a new message, an existing message, a new IE included in the new message, or a new IE included in the existing message. The bearer configuration may indicate that the V2X message needs to be transmitted to a BS belonging to the same MBSFN area.

When an accident occurs, the UE may transmit a V2X message to the first BS using the bearer (S1230).

When the first BS receives the V2X message, the first BS may transmit the V2X message to a BM-SC (S1240). The V2X message may be transmitted via the MCE, the MME, and an MBMS-GW (S1241). Alternatively, the V2X message may be transmitted via the MBMS-GW (S1242).

The BM-SC may check the received V2X message and determine to which BS the V2X message is to be broadcast (S1250).

The BM-SC may trigger either an MBMS session start procedure or an MBMS session update procedure (S1260).

The BM-SC may transmit the V2X message and synchronization-related information to the MBMS-GW (S1270).

The MBMS-GW may transmit the V2X message to all BSs belonging to the same MBSFN area (S1280). The first BS may be excluded from the BSs to which the V2X message is transmitted. The MBMS-GW may transmit the synchronization-related information to all BSs belonging to the same MBSFN area.

All BSs belonging to the same MBSFN area may broadcast the V2X message in respective coverage areas thereof (S1290).

Figure 13:
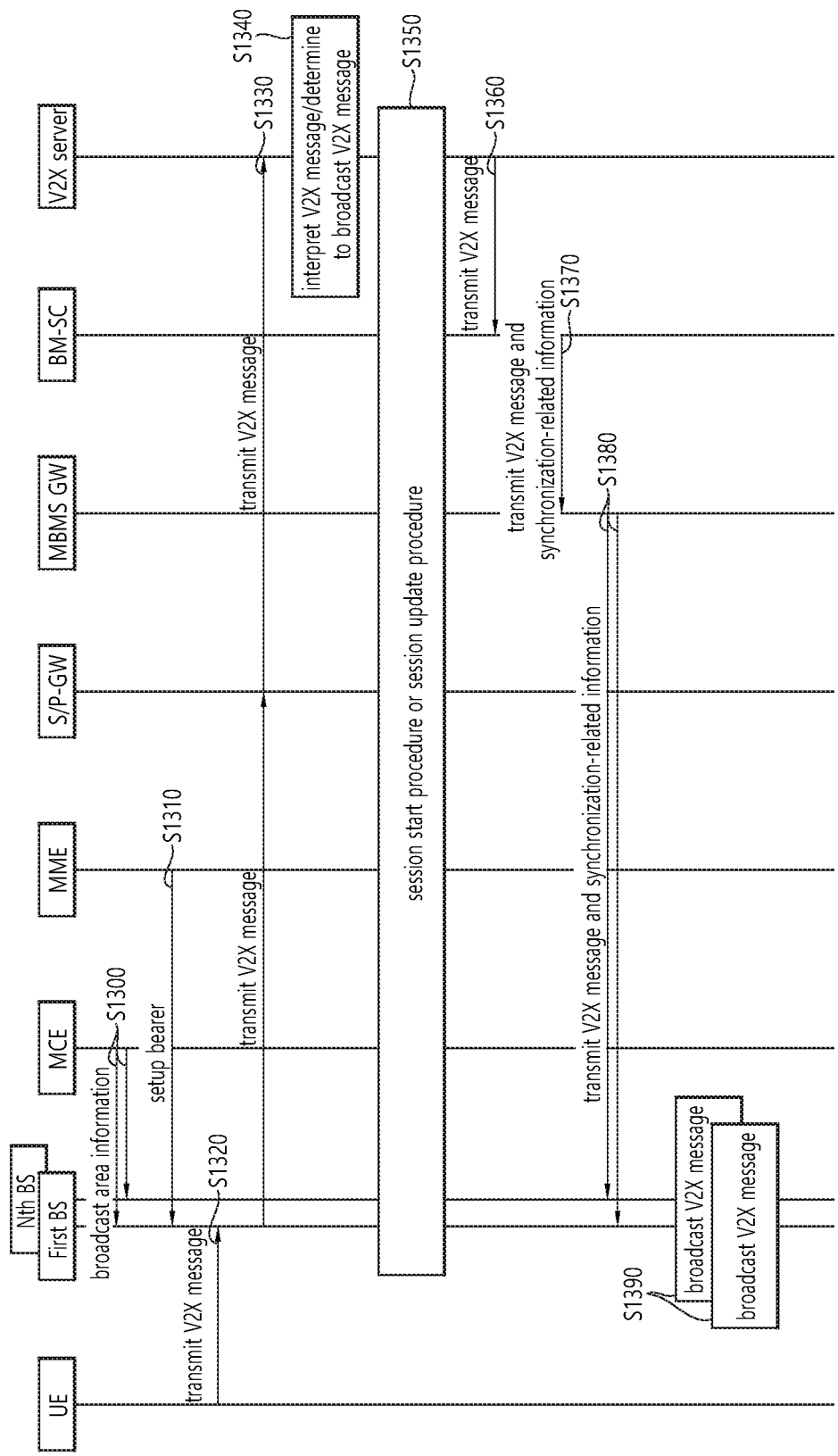
FIG. 13 shows a procedure in which a BS belonging to the same MBSFN area broadcasts a V2X message when an MCE performs presetting.

FIG. 13 shows a procedure in which a BS belonging to the same MBSFN area broadcasts a V2X message when an MCE performs presetting.

Referring to FIG. 13, the MCE may preset an area in which the V2X message is to broadcast to a BS managed by the MCE (S1300). For example, the BS may receive, from the MCE, broadcast area information indicating the area in which the V2X message is to be broadcast. In the case of a BS belonging to the preset area, the MCE may establish a relationship between the BS providing the V2X message and the BS receiving the V2X message. In addition, the MCE may provide the established relationship to the BS.

An MME may transmit a bearer configuration to the BS (S1310). The bearer configuration may be transmitted using a new message, an existing message, a new IE included in the new message, or a new IE included in the existing message. The bearer configuration may indicate that the V2X message needs to be transmitted to a BS belonging to the same MBSFN area.

When an accident occurs, the UE may transmit a V2X message to the first BS using the bearer (S1320).

When the first BS receives the V2X message, the first BS may transmit the V2X message to a V2X server (S1330). The V2X message may be transmitted via a serving/packet gateway (S/P-GW).

The V2X server may determine to broadcast the received V2X message (S1340). Alternatively, the V2X server may interpret the received V2X message and may determine to broadcast the V2X message based on the interpretation.

The V2X server may trigger either an MBMS session start procedure or an MBMS session update procedure (S1350).

The V2X server may transmit the V2X message to a BM-SC (S1360).

The BM-SC may transmit the V2X message and synchronization-related information to an MBMS-GW (S1370).

The MBMS-GW may transmit the V2X message and the synchronization-related information to all BSs belonging to the same MBSFN area (S1380).

All BSs belonging to the same MBSFN area may broadcast a V2X message in respective coverage areas thereof (S1390).

Figure 14:
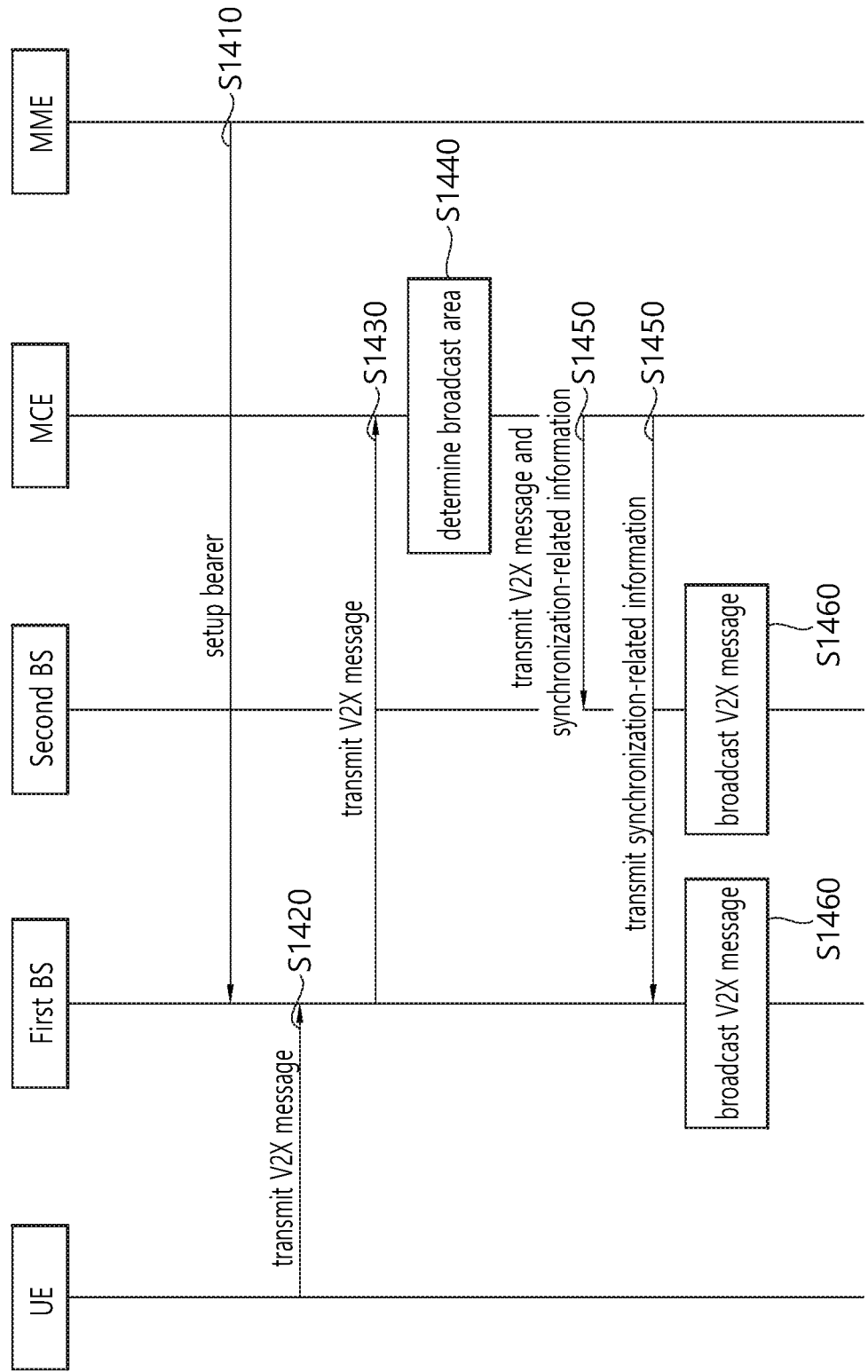
FIG. 14 shows a procedure in which a neighboring BS connected via X2 broadcasts a V2X message when an MCE performs no presetting.

FIG. 14 shows a procedure in which a neighboring BS connected via X2 broadcasts a V2X message when an MCE performs no presetting.

Referring to FIG. 14, an MME may transmit a bearer configuration to the BS (S1410). The bearer configuration may be transmitted using a new message, an existing message, a new IE included in the new message, or a new IE included in the existing message. The bearer configuration may indicate that the V2X message needs to be transmitted to a neighboring BS having an X2 connection.

When an accident occurs, the UE may transmit a V2X message to the first BS using the bearer (S1420).

When the first BS receives the V2X message, the first BS may transmit the V2X message to the MCE (S1430). The V2X message may be transmitted via an M2 interface.

The MCE may determine to which BS the V2X message is to be broadcast based on the V2X message received from the first BS (S1440).

The MCE may transmit the V2X message to a second BS. Further, the MCE may transmit synchronization-related information to the first BS and the second BS (S1450).

The first BS and the second BS may broadcast the V2X message in respective coverage areas thereof (S1460).

Figure 15:
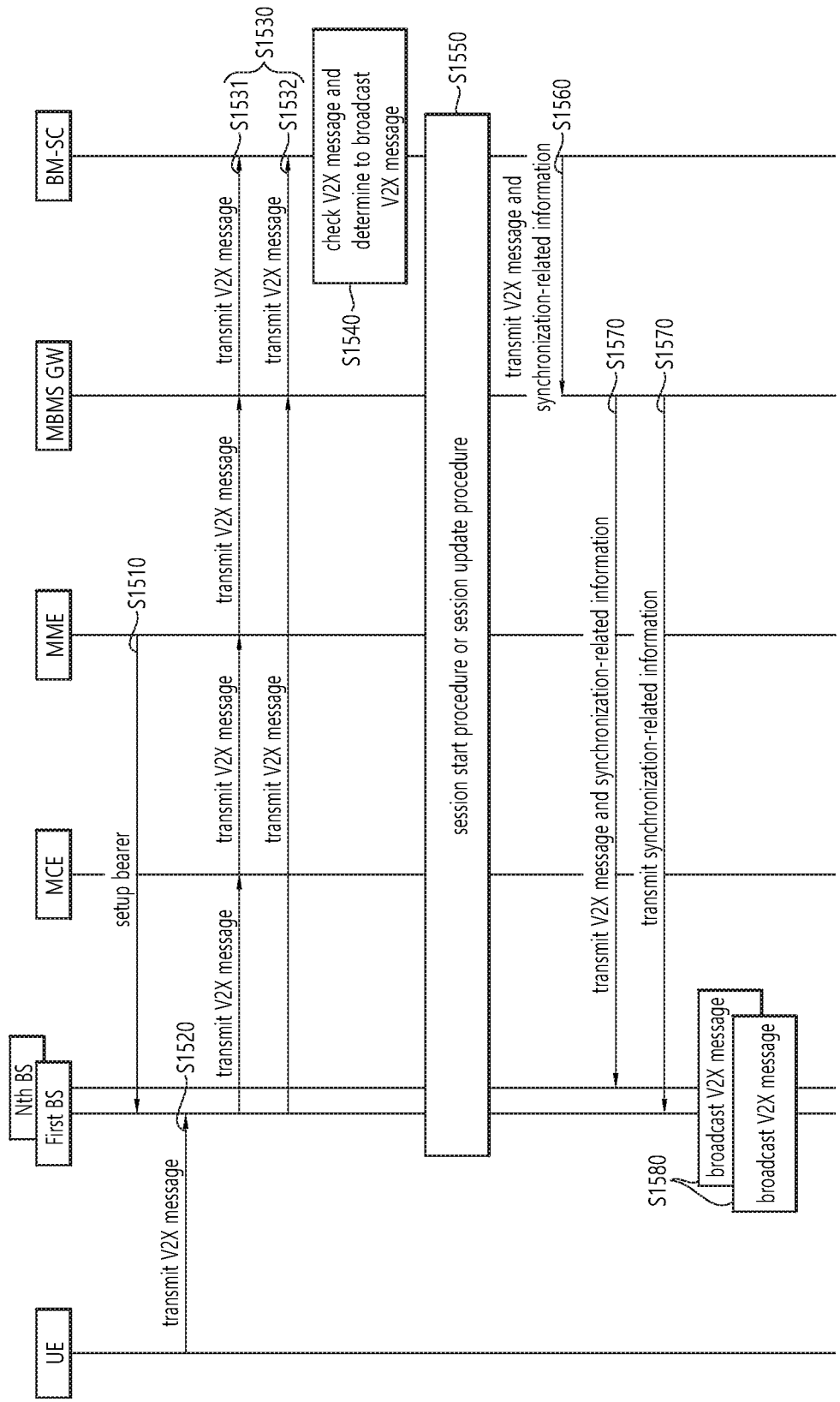
FIG. 15 shows a procedure in which a BS belonging to the same MBSFN area broadcasts a V2X message when an MCE performs no presetting.

FIG. 15 shows a procedure in which a BS belonging to the same MBSFN area broadcasts a V2X message when an MCE performs no presetting.

Referring to FIG. 15, an MME may transmit a bearer configuration to the BS (S1510). The bearer configuration may be transmitted using a new message, an existing message, a new IE included in the new message, or a new IE included in the existing message. The bearer configuration may indicate that the V2X message needs to be transmitted to a BS belonging to the same MBSFN area.

When an accident occurs, the UE may transmit a V2X message to the first BS using the bearer (S1520).

When the first BS receives the V2X message, the first BS may transmit the V2X message to a BM-SC (S1530). The V2X message may be transmitted via the MCE, the MME, and an MBMS-GW (S1531). Alternatively, the V2X message may be transmitted via the MBMS-GW (S1532).

The BM-SC may check the received V2X message and determine to which BS the V2X message is to be broadcast (S1540).

The BM-SC may trigger either an MBMS session start procedure or an MBMS session update procedure (S1550).

The BM-SC may transmit the V2X message and synchronization-related information to the MBMS-GW (S1560).

The MBMS-GW may transmit the V2X message to all BSs belonging to the same MBSFN area (S1570). The first BS may be excluded from the BSs to which the V2X message is transmitted. The MBMS-GW may transmit the synchronization-related information to all BSs belonging to the same MBSFN area.

All BSs belonging to the same MBSFN area may broadcast the V2X message in respective coverage areas thereof (S1580).

<When BS can Interpret Received V2X Message>

FIG. 16 shows a procedure in which a neighboring BS connected via X2 broadcasts a V2X message.

Referring to FIG. 16, the MCE may preset an area in which the V2X message is to broadcast to a BS managed by the MCE (S1610). For example, the BS may receive, from the MCE, broadcast area information indicating the area in which the V2X message is to be broadcast. In the case of a BS belonging to the preset area, the MCE may establish a relationship between the BS providing the V2X message and the BS receiving the V2X message. In addition, the MCE may provide the established relationship to the BS. For example, when the preset area includes a first BS, a second BS, and a third BS, relationships illustrated in Table 2 may be established. Table 2 below is merely an example, and the technical idea of the present invention is not limited thereto.

TABLE 2

| Relationship | V2X message-providing BS | V2X message-receiving BS |
| --- | --- | --- |
| 1 | First BS | Second BS, third BS |
| 2 | Second BS | First BS, third BS |
| 3 | Third BS | Second BS |

When an accident occurs, a UE may transmit a V2X message to the first BS (S1620).

The first BS may identify whether to determine an area in which the V2X message is to be broadcast (S1630). Such determination may be performed based on an interpretation of the V2X message received by the UE. When the first BS decides to perform such determination, the first BS may determine an area in which the V2X message is to be broadcast based on the area information preset by the MCE. For example, the first BS may create new relationships in Table 3 based on the broadcast area information of Table 2. Table 3 below is merely an example, and the technical idea of the present invention is not limited thereto.

TABLE 3

| Relationship | V2X message-providing BS | V2X message-receiving BS |
| --- | --- | --- |
| 1 | First BS | Second BS |
| 2 | Second BS | First BS |
| 3 | Third BS | Second BS |

The first BS may transmit the V2X message and synchronization-related information to the second BS (S1640).

The first BS and the second BS may broadcast the V2X message in respective coverage areas thereof (S1650).

FIG. 17 shows a procedure in which a BS belonging to the same MBSFN area broadcasts a V2X message.

Referring to FIG. 17, when an accident occurs, a UE may transmit a V2X message to a first BS (S1710).

When the first BS receives the V2X message, the first BS may check whether to determine an area in which the V2X message is to be broadcast (S1720). Such determination may be performed based on an interpretation of the V2X message received by the UE. When the first BS decides not to perform such determination, the first BS may transmit the V2X message to a BM-SC (S1730). The V2X message may be transmitted via an MCE, an MME, and a MBMS-GW (S1731). Alternatively, the V2X message may be transmitted via the MBMS-GW (S1732).

The BM-SC may check the received V2X message and determine to which BS the V2X message is to be broadcast (S1740).

The BM-SC may trigger either an MBMS session start procedure or an MBMS session update procedure (S1750).

The BM-SC may transmit the V2X message and synchronization-related information to the MBMS-GW (S1760).

The MBMS-GW may transmit the V2X message to all BSs belonging to the same MBSFN area (S1770). The first BS may be excluded from the BSs to which the V2X message is transmitted. The MBMS-GW may transmit the synchronization-related information to all BSs belonging to the same MBSFN area.

All BSs belonging to the same MBSFN area may broadcast the V2X message in respective coverage areas thereof (S1780).

Figure 18:
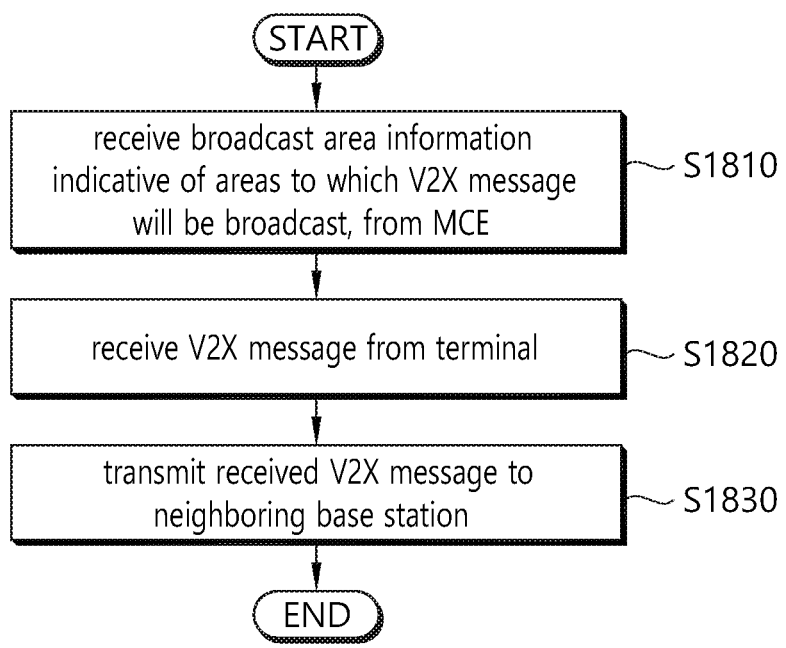
FIG. 18 is a block diagram illustrating a method in which a BS transmits a V2X message.

FIG. 18 is a block diagram illustrating a method in which a BS transmits a V2X message.

Referring to FIG. 18, the BS may receive broadcast area information indicating an area in which a V2X message is to be broadcast from an MCE (S1810). The broadcast area information may be preset by the MCE.

The broadcast area information may include information on a BS to which the received V2X message is to be transmitted. In this case, the BS may not be connected to a V2X server. The BS may receive a bearer configuration for transmitting and receiving the V2X message from an MME.

The BS may determine a BS to which the received V2X message is to be transmitted based on the broadcast area information. The BS may determine an area in which the received V2X message is to be broadcast based on the broadcast area information. In this case, the BS may be connected to the V2X server.

The BS may receive the V2X message from a UE (S1820).

The BS may transmit the received V2X message to a neighboring BS (S1830).

The neighboring BS may be included in the information on the BS to which the received V2X message is to be transmitted. The neighboring BS may be connected to the BS via X2. The neighboring BS may be determined as a BS to which the received V2X message is to be transmitted.

The BS may transmit synchronization-related information to the neighboring BS. The BS may then broadcast the V2X message in the coverage area thereof.

Figure 19:
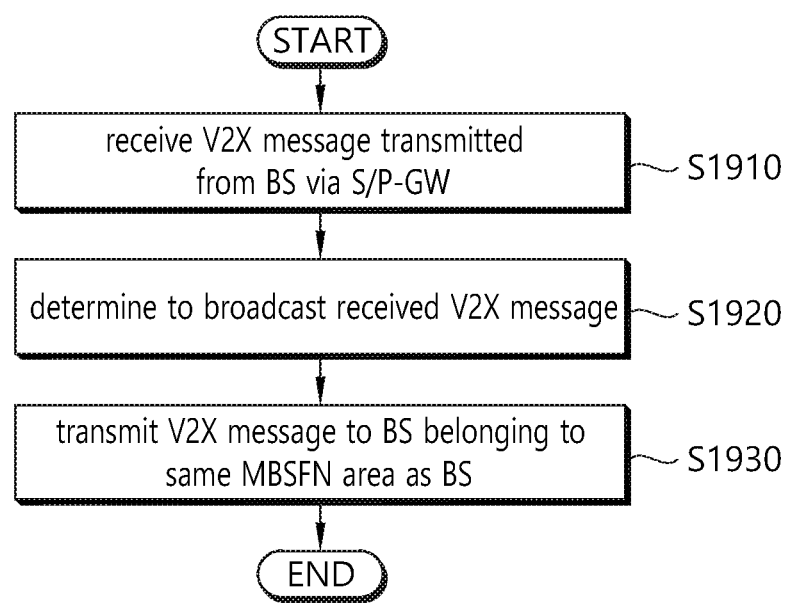
FIG. 19 is a block diagram illustrating a method in which a V2X server transmits a V2X message.

FIG. 19 is a block diagram illustrating a method in which a V2X server transmits a V2X message.

Referring to FIG. 19, the V2X server may receive a V2X message transmitted from a BS via an S/P-GW (S1910).

The V2X server may determine to broadcast the received V2X message (S1920). The V2X server may interpret the received V2X message and may determine to broadcast the received V2X message based on the interpretation.

The V2X server may transmit the V2X message to a BS belonging to the same MBSFN area as the BS (S1930). The V2X message may be transmitted to the BS via a BM-SC and an MBMS-GW.

Figure 20:
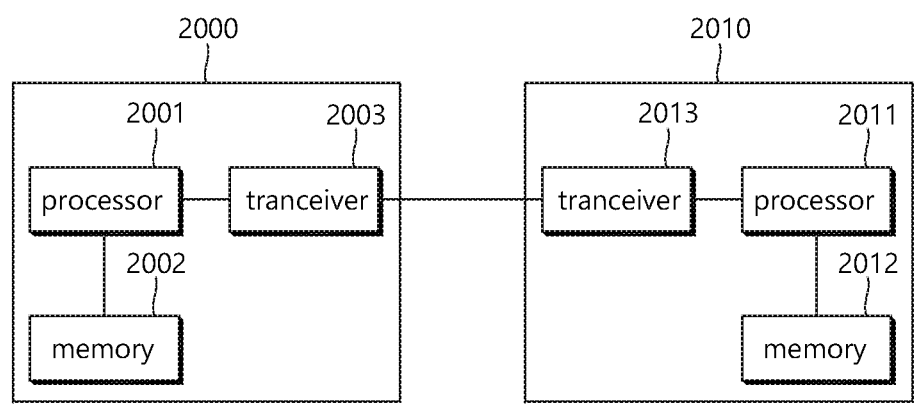
FIG. 20 is a block diagram illustrating a wireless communication system according to the embodiment of the present invention.

FIG. 20 is a block diagram illustrating a wireless communication system according to the embodiment of the present invention.

A BS 2000 includes a processor 2001, a memory 2002 and a transceiver 2003. The memory 2002 is connected to the processor 2001, and stores various information for driving the processor 2001. The transceiver 2003 is connected to the processor 2001, and transmits and/or receives radio signals. The processor 2001 implements proposed functions, processes and/or methods. In the above embodiment, an operation of the BS may be implemented by the processor 2001.

An MCE 2010 includes a processor 2011, a memory 2012 and a transceiver 2013. The memory 2012 is connected to the processor 2011, and stores various information for driving the processor 2011. The transceiver 2013 is connected to the processor 2011, and transmits and/or receives radio signals. The processor 2011 implements proposed functions, processes and/or methods. In the above embodiment, an operation of the MCE may be implemented by the processor 2011.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for transmitting, by a base station (BS), a vehicle-to-everything (V2X) message in a wireless communication system, the method comprising:

receiving a first broadcast area information including a first BS set among neighboring BSs from a multi-cell coordination entity (MCE), wherein another BS among the neighboring BSs receives a second broadcast area information including a second BS set among the neighboring BSs from the MCE, wherein at least one of the neighboring BS in the first BS set is different from the second BS set, and wherein the first and the second broadcast area information are preset by the MCE;

receiving a first V2X message from a user equipment (UE);

performing an interpretation of the first V2X message, wherein the interpretation is performed by a V2X server included in the BS;

checking whether to determine a first target BS set among the first BS set based on the interpretation;

determining the first target BS set based on the first broadcast area information, wherein at least one of the first BS set is not included in the first target BS set; and transmitting the first V2X message and synchronization-related information to a neighboring BS in the first target BS set, wherein a second V2X message received by the another BS is transmitted to a neighboring BS in the second BS set, and wherein the first V2X message is broadcasted, by the BS and the neighboring BS in the first target BS set, to a coverage area, respectively, based on the synchronization-related information and the second V2X message is broadcasted, by the another BS and the neighboring BS in the second BS set, to a coverage area, respectively.

2. The method of claim 1, further comprising:

receiving, by the BS, a bearer configuration for transmitting and receiving the V2X message from a mobility management entity (MME).

3. A base station (BS) transmitting a vehicle-to-everything (V2X) message in a wireless communication system, the BS comprising:

a memory; a transceiver; a V2X server; and a processor, connected with the memory and the transceiver, that:

controls the transceiver to receive a first broadcast area information including a first BS set among neighboring BSs from a multi-cell coordination entity (MCE), wherein another BS among the neighboring BSs receives a second broadcast area information including a second BS set among the neighboring BSs from the MCE, wherein at least one of the neighboring BS in the first BS set is different from the second BS set, and wherein the first and the second broadcast area information are preset by the MCE;

controls the transceiver to receive a first V2X message from a user equipment (UE);

controls the V2X server to perform an interpretation of the first V2X message;

checks whether to determine a first target BS set among the first BS set based on the interpretation;

determines the first target BS set based on the first broadcast area information, wherein at least one of the first BS set is not included in the first target BS set; and controls the transceiver to transmit the first V2X message and synchronization-related information to a neighboring BS in the first target BS set, wherein a second V2X message received by the another BS is transmitted to a neighboring BS in the second BS set, and wherein the first V2X message is broadcasted, by the BS and the neighboring BS in the first target BS set, to a coverage area, respectively, based on the synchronization-related information.

* * * * *